United States Patent [19]

Baumer

[11] 3,990,736
[45] Nov. 9, 1976

[54] CAMPER CONSTRUCTION

[76] Inventor: Allen Prescott Baumer, 1007 Monroe St., Saginaw, Mich. 48602

[22] Filed: Apr. 15, 1974

[21] Appl. No.: 460,704

[52] U.S. Cl. .......................... 296/23 MC; D12/100
[51] Int. Cl.² ............................................ B60P 3/32
[58] Field of Search ................ 296/23 MC, 10; D12/100–105, 99, 156, 83; D13/1 F; 244/119

[56] References Cited
UNITED STATES PATENTS

| 912,840 | 2/1909 | Graham et al. | D12/103 |
| 2,907,601 | 10/1959 | Kuchenbecker et al. | 296/23 R |
| 3,708,199 | 1/1973 | Throssell | 296/23 MC |
| 3,718,295 | 2/1973 | Moore | 244/119 |
| D220,382 | 4/1971 | Cooper | D13/1 F |

Primary Examiner—L. J. Paperner
Assistant Examiner—Donald W. Underwood
Attorney, Agent, or Firm—John J. Swartz

[57] ABSTRACT

A camper unit for a pick-up truck including a tubular body which is at least partially barrel-shaped.

17 Claims, 7 Drawing Figures

CAMPER CONSTRUCTION

BACKGROUND OF THE INVENTION

This invention relates to a mobile, habitable, shelter unit, and more particularly to a camper unit, at least partially configured in the shape of a barrel, adapted to be detachably mounted on a support bed of a pick-up truck.

A camper unit of the type disclosed herein is detachably mounted on a pick-up truck for movement therewith. When the pick-up truck reaches a camping destination, the camping unit may be detached therefrom and independently supported by ground engageable jacks.

The prior art pick-up truck mounted, camping units are generally of box-like configuration with flat fronts which create substantial drag to reduce the operating efficiency. Although attempts have been made to streamline camper units in general, the resulting constructions are not aesthetic and drastically reduce the usable interior space.

Accordingly, it is an object of the present invention to provide a camping unit adapted to be mounted on a pick-up truck and configured, at least in part, in the shape of a barrel.

Another object of the present invention is to provide a camper adapted to be mounted on a pick-up truck which is streamlined and aesthetically appealing.

Yet another object of the present invention is to provide a camper for a pick-up truck including a plurality of longitudinally spaced end hoops spanned by side and top staves or curvilinear slats.

It is another object of the present invention to provide on a pick-up truck box having side walls, a camper unit of the type described having annular end portions which are of such size that they fit within the pick-up box and intermediate sections which are of enlarged diameter and extend at least partially along the outside of the box.

Another object of the present invention is to provide on the box of a pick-up truck, a camper unit of the type described including curvilinear side wall members disposed such that the lowermost mid-portion of the side wall member on each side of the camper extends to a level below the top surface of the upstanding side walls of the pick-up box.

It is yet another object of the present invention to provide a camping unit of the type described including partial, lower, side and bottom wall portions projecting forwardly from a rear wall and having a girth which gradually forwardly increases and extends forwardly toward the rear of, but below, the bed of the pick-up truck.

Other objects and advantages of the present invention will become apparent to those of ordinary skill in the art as the description thereof proceeds.

SUMMARY OF THE INVENTION

A camper unit for a pick-up truck and the like including generally parallel front and rear end walls which are at least partially circular in configuration, semicylindrical, longitudinally curvilinear side and top walls spanning the end walls to provide a radially outwardly bulging mid-section. Partial, lower, side and bottom walls, having a girth which gradually forwardly increases, extends forwardly of the rear wall to a level below the bed of the truck.

These and other objects of the present invention will be more readily understood by reference to the accompanying drawings, wherein.

Figures 1, 2, 3:
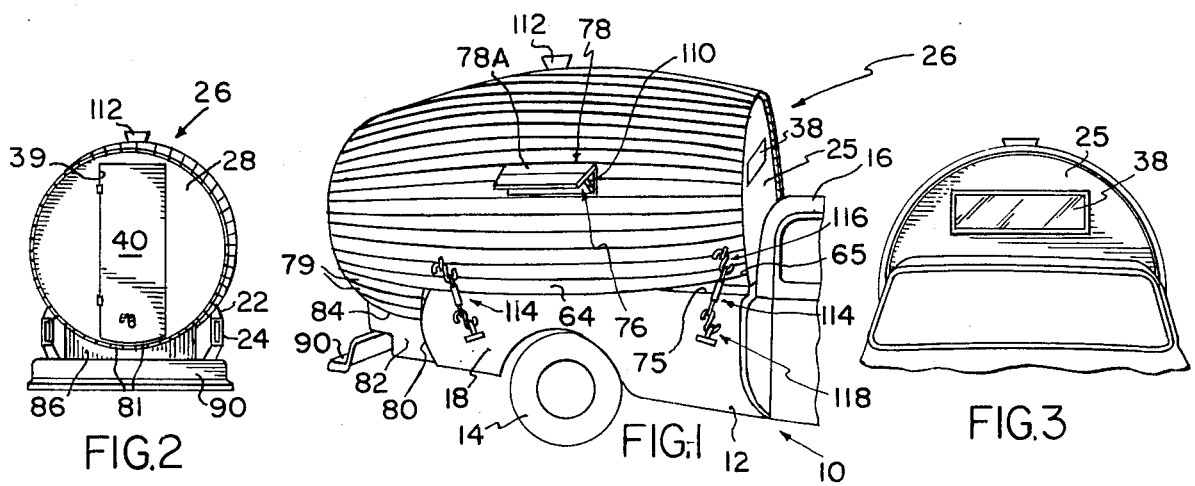
FIG. 1 is a front perspective view illustrating a camper unit constructed according to the present invention mounted on the box of a pick-up truck.
FIG. 2 is a rear perspective view thereof.
FIG. 3 is a front elevational view thereof.

Apparatus constructed according to the present invention is particularly adapted for use with a pick-up truck, generally designated 10, having a body 12 supported on road-engageable wheels 14 and provided with a cab 16 at its forward end and a load-carrying box 18 at its rear end. The box 18 includes a bed 20, mounting upstanding side walls 22 and electrical energizable tail lights 24, as usual.

A camper unit constructed according to the present invention is generally designated 26 and is mounted in the pick-up box 18. The camper unit 26 is generally tubular and includes a floor, generally designated 27, mounting a pair of vertically disposed front and rear parallel end walls 25 and 28, respectively. The camper unit floor 27, which is supported by the pick-up bed 20, includes a sub-floor layer 29 and a main floor layer 30, separated by spacer bars 32 and a layer 34 of insulation. Two longitudinally extending, vertical side beam 35 are mounted on opposite sides of the floor 27 and are fixed to the front and rear end walls 25 and 28.

The front and rear end walls 25 and 28 are mounted on the camper unit floor 27 by a pair of circular, identical, end channel hoops 36 which are of such size (i.e., 6 foot diameter), that the front hoop 36 fits within the pick-up box side walls 22. The perimetrical edge portion of said end walls 25 and 28 are received by the channel hoops 36. The front wall 25 includes a window 38 at a level above the cab 16. The rear wall 28 includes a doorway 39 receiving a rear door 40 which is mounted for swinging movement on the wall 28 via hinges 41. The bottom of the doorway 39 is substantially flush with, or slightly above, the main floor layer 30. A handle 42, in the shape of a beer barrel tap, is centrally mounted on the door for operating a door latch 43.

The camper unit includes a pair of three-quarter, intermediately located hoops 44 having an enlarged diameter (i.e., 7-foot) so that the lowermost terminal end portions 45 extend outside the pick-up box side walls 22. The lower terminal intermediate hoop portions 45 on opposite sides of the camper are coupled together via step-like angle iron coupling members, generally designated 46. Each coupling member 46 includes a base 48 mounting at each end vertical step sections 49 and 50. The coupling members 46 prevent the lower ends 45 of the three-quarter hoops 44 from bowing outwardly.

Figures 6, 7:
FIG. 6 is a slightly reduced, sectional top plan view taken along the line 6—6 of FIG. 4.
FIG. 7 is a further enlarged, sectional end view, taken on the line 7—7 of FIG. 4, more particularly illustrating the staves.

The step sections 49 and 50 are sandwiched between outer and inner wall coverings, generally designated 54 and 56, respectively. The inner covering 56 includes an uppermost, generally horizontal, layer of sheeting 58 overlying the upper angle iron step sections 50 to provide a longitudinal seat for passengers. The laterally outer edges 59 of the sheeting 58 is curvilinear as illustrated in FIG. 6.

Figure 4:
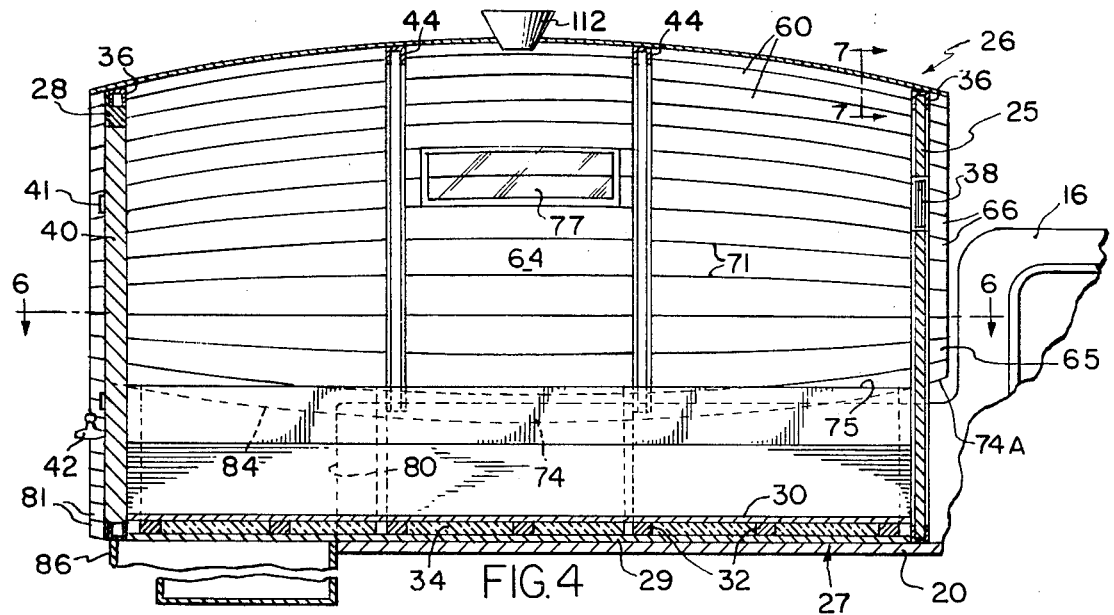
FIG. 4 is an enlarged, sectional side view.
Figure 5:
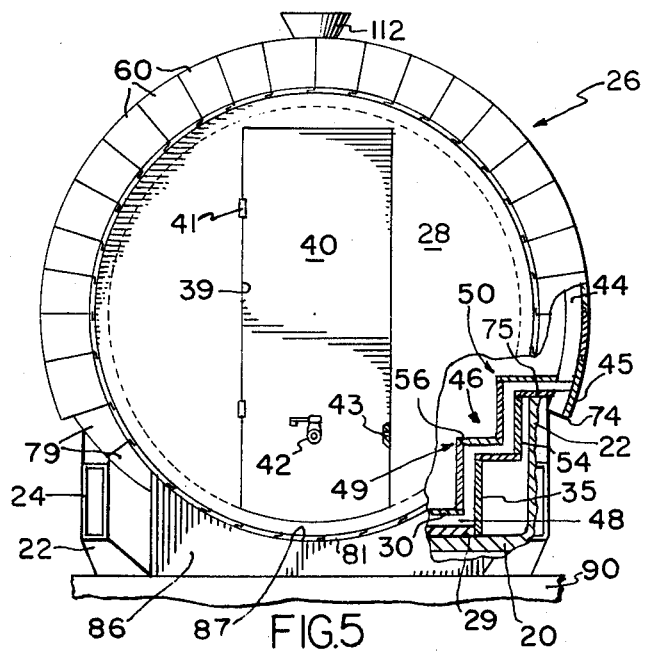
FIG. 5 is a partly sectional, rear elevational view.

The upper and side portions of the end hoops 36 and intermediate hoop sections 44 are covered by longitudinally and circumferentially symmetrical upper and top side wall portions comprising a plurality of longitudinally curvilinear, barrel staves or slats 60 which are fastened to the hoops 36 and 44 via bolts 62 or the like. As illustrated, the mid-portion 64 of each outwardly bowing slat is wider than the slat end portions 66 which have sides which converge forwardly and rearwardly in a direction toward the front and rear ends of the camper unit. The barrel staves 60 are formed with mating tongue and groove portions 70 and 72 to provide a dirt-proof seal. The perimetrically spaced demarcating seams 71 between adjacent slats 60 are nonparallel, curvilinear, and converge in a direction toward the front and rear ends of the camper. The slats 60 may be considered as zones which each have forwardly and rearwardly converging side edge portions 70, 72. As illustrated in FIGS. 1, 4 and 5, the mid-portions 64 of the lowermost full length side staves 60 are below the level of the ends 65 thereof. The lowermost portion 74 of the mid-portion 64 on each side is disposed outside and below the top 75 of the pick-up box side wall 22 whereas the lowermost portions 74A of the end portions 65 are inside, and above the top of the adjacent pick-up box side walls 22. This creates the apearance that the barrel-shaped camper unit side walls continue down into the body of the truck.

An openable and closeable window, generally designated 76, is provided in each side wall of the camper unit and includes a glass pane 77 removably covered by a swingably mounted cover 78 comprising curvilinear stave sections 78A forming a continuation of the aligned camper body slats 60. The stave sections are held in the open position by scissor links 110. As illustrated in FIG. 1, a plurality of reduced length bottom and side wall curvilinear staves 79 extend forwardly from the rear wall 28 to a level below the camper unit floor 27 and terminate short of the rear 80 of the pick-up box 22. The staves 79 have a forwardly increasing girth and are less than one half the length of the full length staves 60. The staves 79 add to the impression that the full length staves 60 continue about the complete perimetrical rim of the hoops 28. Rear stub staves 81 are mounted along the underside of the rear hoop 28 between the stave sections 79 to add the effect that the full length staves 60 extend about the entire perimetrical rim of the hoops 28. The seams 71 between the adjacent slats may be sealed with suitable calking to waterproof the camper unit.

Fixed to the rear side beams 35 rearward of the box 18 are vertical side boards 82 having curvilinear upper portions 84 cut to match the contour of the short staves 79. A rear plate 86 spans the side boards 82 and includes a curvilinear upper portion 87 cut to match the curvature of the underside of the staves 81. The boards 82 and 86 create the impression that the barrel-shaped camper unit is supported on a barrel rack or wine rack. As is clear from FIG. 2, the rear tail lights 24 are not obstructed by the camper unit 26. A bumper 90, is disposed at the rear of the camper box 26 and is secured to the pick-up truck chassis via suitable telescoping tubes (not shown) to provide a step for entering the rear camper door 40.

A cork-shaped vent 112 is provided in the top wall of the camper unit 26 and includes upwardly diverging side walls. The camper unit 26 is detachably held on the pick-up box 18 by any suitable means such as four turn-buckle assemblies 114 connected with mounts 116 and 118 on the camper 26 and cab frame 12 respectively.

A traveler can climb into the camper unit via the rear door 40 and can sleep, prepare and eat meals and otherwise enjoy the comfort, privacy, and convenience of a camper unit. This unit, due to its unique shape, is streamlined, minimizes air drag, but yet enables a man to stand fully upright in the camping unit. The barrel staves 60, 79, and 81, the end walls 25 and 28, and the door 40 are preferably constructed of wood to provide an authentic barrel appearance.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:
1. A camper unit for attachment to a pick-up truck and the like having a support bed and laterally spaced upstanding sidewalls thereon comprising:
generally parallel, upstanding front and rear end wall means having top and side circular portions:
semi-cylindrical, curvilinear, side and top wall means, spanning said top and side circular portions of said circular end wall means, said side and top wall means having a radially outwardly bulging mid-section portion between the opposite ends thereof, the diameter of the opposite ends of said side and top wall means being less than the diameter of the mid-section portion;
a floor adapted to be supported by said side and end wall means adjacent the bed of said truck; and
longitudinally curvilinear, circumferentially extending, lower side and bottom wall means matching the curvature of, and circumferentially abutting the rear portion of, said side and top wall means, said side and bottom wall means, having a girth which gradually forwardly increases, extending forwardly of said rear wall means and disposed at least in part at a level below the level of said floor for abutting the rear edges of the upstanding sidewalls such that said lower side and bottom wall means appears to project into said pickup truck.

2. The unit as set forth in claim 1 wherein said lower side and bottom wall means extends forwardly not more than one-half the distance between said rear and front end wall means.

3. The camper unit as set forth in claim 1 wherein said rear end wall means is circular in configuration, the diameters of said front and rear end wall means being substantially equal.

4. The camper unit as set forth in claim 1 including vent means at the top of said unit having a generally vertically extending stack provided with an annular upwardly, outwardly flaring side wall.

5. The camper unit as set forth in claim 1 wherein said front and rear end wall means includes a pair of front and rear equal diameter annular end hoops, and at least one hoop section of a larger diameter is provided intermediate said end hoops, and a plurality of longitudinally curvilinear, staves is provided and span the upper and side portions of said end hoops and said intermediate hoop sections.

6. The camper unit as set forth in claim 5 wherein said lower side and bottom wall means includes a plurality of curvilinear stave sections circumferentially abutting and flush with the rear portion of said plurality of staves, at least one of said stave sections projecting to a level below said floor.

7. The camper unit as set forth in claim 1 wherein the lowermost mid-section portion of said wall means is at a lower level than the lowermost end portions of said wall means.

8. The camper unit as set forth in claim 1 wherein said side and top wall means comprises a plurality of curvilinear slats, the middle portion of the lowermost slat on each side of said camper unit extending to a lower level than the ends thereof.

9. In combination:
  a pick-up truck including a cab at the forward end thereof and an open top, camper unit receiving box rearward of the cab, said box being open at its rear end and having a support bed mounting laterally spaced, upstanding side walls; and
  a camper unit detachably mounted on said box including
    at least partially circular, front and rear, longitudinally spaced end wall means, said front end wall means including a lower portion received between said side walls and extending downwardly into said box so that the lowermost portion thereof is at a level substantially below the upper ends of said side walls and adjacent said support bed;
    circumferentially and longitudinally extending top wall means and side wall means spanning said end walls, said top wall means and said side wall means including longitudinal spaced end portions adajcent the upper portions of said end wall means
    said side wall means and said top wall means having a radially outwardly bulging mid-section interjacent said longitudinal end portions;
    the mid-section of said side wall means on each side of said camper unit having lowermost terminal portions disposed laterally outwardly of said box side walls and at a level lower than the lowermost portion of at least one longitudinal end portion of said side wall means and lower than the upper ends of said pick-up box side walls, at least said one of the lowermost, longitudinal end portions of said side wall means on each side of said camper unit being disposed laterally of and at a level above, said pick-up box side walls.

10. In combination:
  a pick-up truck including a cab at the forward end thereof and an open top, camper unit receiving box rearward of the cab, said box being open at its rear end and having a support bed mounting laterally spaced, upstanding side walls; and
  a camper unit detachably mounted on said box including,
    front and rear, generally parallel end walls, the lower portion of said front end wall being received between said side walls and extending downwardly into said box so that the lowermost portion thereof is adjacent to said support bed;
    a plurality of circumferentially adjacent, longitudinally curvilinear slats spanning said end walls to provide curvilinear top and side wall means having a radially outwardly bulging mid-section;
    the mid sections of the lowermost slats on opposite sides of said camper unit being disposed laterally outwardly of said pick-up box side walls and at a level lower than the longitudinal end portions of said lowermost slats and lower than the upper edges of said pick-up box side walls, at least one end portion of the lowermost slat on each side of said camper unit being disposed laterally inwardly, and at a level above the upper edges of said pick-up box side walls.

11. The combination as set forth in claim 10 wherein said slats include mating tongue and groove side portions.

12. A camper unit for a pick-up truck including a cab, and an open top, camper unit receiving box, rearward of said cab, which has a support bed mounting laterally spaced, longitudinally extending side walls, said camper unit comprising:
  a hollow, generally tubular body having
    an upper portion adapted for mounting at least in part at a level above the side walls of said box, and
    a lower portion receivable at least in part between said box side walls;
  said upper portion, including a section of increased girth between opposite ends thereof;
  said upper portion having side and top wall means which inwardly converge in opposite directions forwardly and rearwardly of said increased girth section;
  said section of increased girth having a top wall and laterally outer side walls joined to said top wall, said side walls having upwardly converging upper end portions joined to laterally opposite sides of said top wall and downwardly converging lower terminal edge portions which are in laterally spaced relation so as to be laterally outwardly of said pick-up box side walls, and at a level below the upper edges of said pick-up box side walls.

13. The unit as set forth in claim 12 wherein said section of increased girth includes longitudinally spaced, downwardly opening hoop sections having laterally spaced terminal ends adapted to be disposed outwardly of said pick-up box side walls.

14. The camper unit as set forth in claim 12 wherein the rear end of said tubular body includes bottom wall means extending downwardly to a level below and laterally inwardly of said terminal edge portions so as to be disposed laterally inwardly of and rearwardly of said box side walls.

15. A camper unit as set forth in claim 12 including a pair of longitudinally extending upstanding side members underlying and adjacent the rearward end of said tubular body to create the impression that the camper unit is supported on a barrel rack.

16. A camper unit as set forth in claim 12 including a pair of longitudinally spaced, circular, end hoops mounting said opposite ends and at least one downwardly opening, partial hoop larger in diameter than said end hoop and disposed between said end hoops, said unit further including stepped coupling members spanning laterally opposite sides of partial hoop to prohibit the laterally opposite sides of said partial hoop from bowing outwardly.

17. In combination:

a pick-up truck including a cab and an open top, camper unit receiving box rearward of said cab, said box having a support bed mounting laterally spaced, longitudinally extending side walls;

a camper unit comprising:
  a hollow, generally tubular body having
    an upper portion disposed at least in part at a level above the side walls of said box, and
    a lower portion received at least in part between the side walls of said box,
  said upper portion including a section of increased girth between opposite ends thereof;
    said upper portion having side and top wall means which inwardly converge in opposite directions forwardly and rearwardly of said increased girth section;
  said section of increased girth having a top wall and laterally opposed, outer side walls joined to said top wall, said side walls having upwardly converging upper end portions joined to laterally opposite sides of said top wall and downwardly converging terminal lower edge portions which are in laterally spaced relation with each other and are laterally outwardly of said pick-up box side walls and at a level below the upper edges of said pick-up box side walls.

* * * * *